United States Patent Office 3,441,826
Patented Apr. 29, 1969

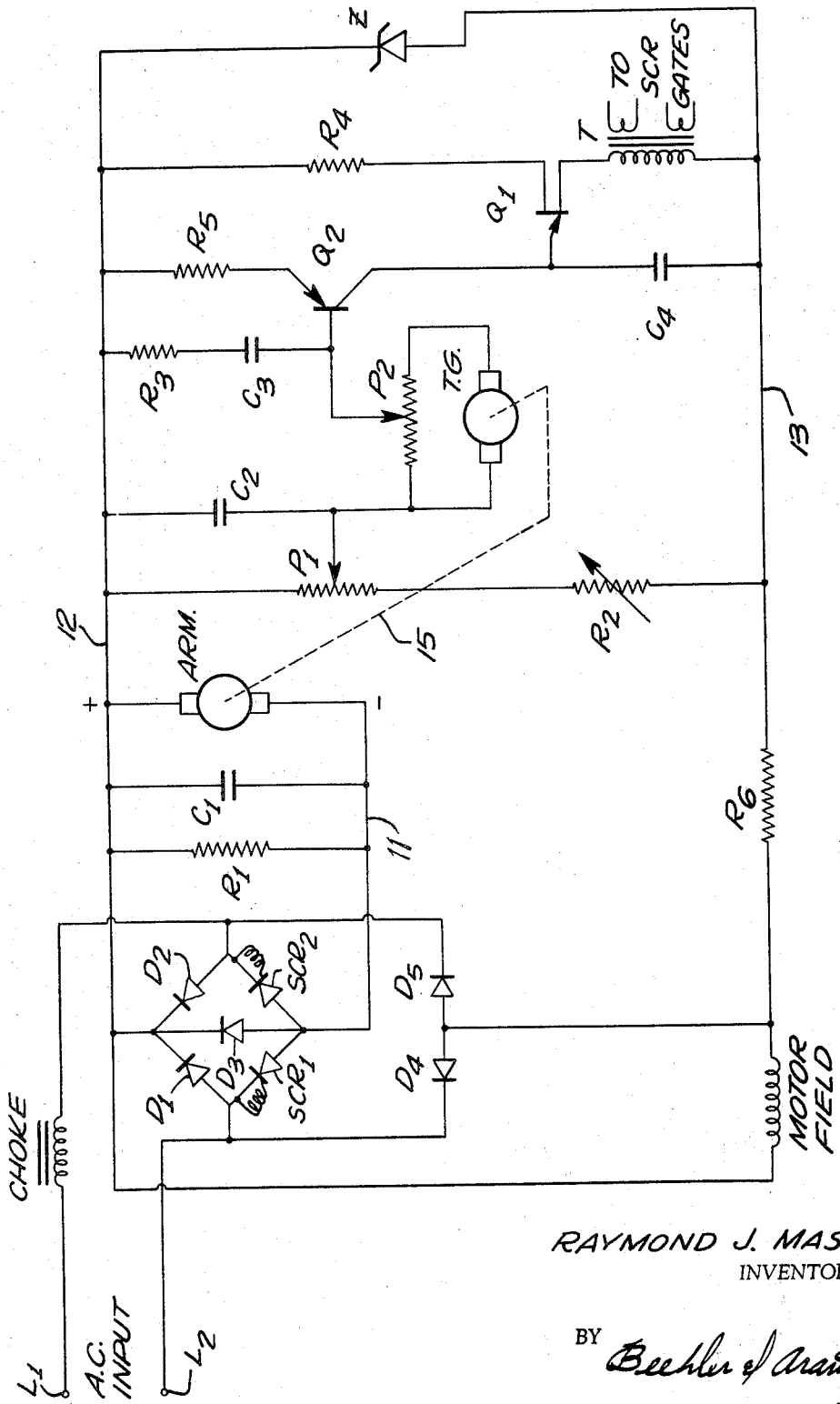

3,441,826
TACHOMETER FEEDBACK CIRCUIT FOR D.C. MOTOR SPEED CONTROL
Raymond J. Mason, Lynwood, Calif., assignor to Minarik Electric Company, Los Angeles, Calif., a corporation of California
Filed Dec. 21, 1966, Ser. No. 603,614
Int. Cl. H02k 27/20; H02p 5/00; G05b 5/00
U.S. Cl. 318—327                                 5 Claims

ABSTRACT OF THE DISCLOSURE

A complete motor speed controller including a full-wave solid-state rectifier circuit for converting alternating current into direct current, a pulse transformer associated with a pair of silicon-controlled rectifiers that are contained in the full-wave rectifier circuit for initiating their conductivity during respective half-cycles of the applied A.C. voltage, a unijunction transistor for pulsing the pulse transformer, a charging capacitor associated with the unijunction transistor for controlling its firing times, a transistor for controlling the bias of the unijunction, a potentiometer for establishing the bias of the transistor and hence establishing the ordinary operating speed of the motor, a tachometer generator, a shaft mechanically coupling the tachometer generator to the motor armature so that the D.C. output voltage of the tachometer generator is proportional to the speed of rotation of the motor armature, and a circuit connecting the output of the tachometer generator in opposition to the potential derived from the potentiometer so that the bias voltage of the transistor is equal to that supplied by the potentiometer minus that supplied by the tachometer generator, with the result that increases in the motor speed diminish the bias on the transistor and delay the firing of the unijunction to a later point in each half-cycle while decreases in the motor speed have the opposite effect.

---

The present invention relates to a control circuit for stabilizing the speed of a D.C. motor at a selected value despite fluctuations both in the supply line voltage and in the mechanical load driven by the motor.

CROSS REFERENCES TO RELATED APPLICATIONS

My copending prior application Ser. No. 391,627 filed Aug. 24, 1964, and my prior copending application Ser. No. 587,063 filed Oct. 17, 1966, both of which are assigned to the same assignee as this application, disclose complete motor controllers which are directed to the same general purpose as the motor controller of the present invention, but which, however, do not incorporate either a tachometer generator or the associated circuitry for coupling it into the motor controller.

BACKGROUND OF THE INVENTION

The tachometer generator is a well-known device which, when mechanically coupled to a rotating shaft or motor armature, produces a D.C. voltage whose magnitude is proportional to the speed of rotation. Motor speed control circuits generally involve some type of feedback signal, which may in some instances be derived as a function of the magnitude of current drawn by the motor armature, or in other instances a function of the voltage across the motor armature (either the D.C. voltage or a ripple voltage, in some cases), or it may be derived as a complex function of two or more such signals. It is also known to mechanically derive the feedback signal from the armature rotation by driving a tachometer generator whose output voltage is used for control purposes.

Such feedback circuits are necessarily regenerative in nature, in order to accomplish their intended purpose, but their regenerative nature also tends to produce regeneration or oscillation of the electrical control circuits that is undesired. Specifically, in the motor controllers of the prior art it has been necessary to include a filtering circuit as a part of the speed control circuit, for the purpose of filtering out the voltage variations or alternations which would tend to produce oscillation. The concept of these speed control circuits is, in general, that the feedback signal, of an inherently regenerative polarity, is filtered into a purely D.C. form so that it cannot result in creating undesired A.C. oscillations. However, as is readily apparent, continued variations in the mechanical load imposed upon the motor, or in the line supply voltage, will produce corresponding variations in the D.C. feedback voltage. Hence the possibility of regenerative oscillations arising from the feedback and control circuitry is necessarily always present.

The prior art has provided motor speed control circuits incorporating full-wave solid-state rectifier circuits as shown in my above referenced copending applications, and in which the silicon-controlled rectifiers are controlled through a pulse transformer whose pulsing action is in turn under the control of a unijunction transistor actuated by a charging capacitor and with its D.C. bias controlled by a separate transistor. The prior art has provided motor control circuits of this type in which a tachometer generator has been utilized for providing a feedback signal. However, the specific circuitry for coupling the tachometer generator into the control circuit, and for providing the associated filtering that is required, has been rather complex and has also produced less efficient results than might be desired.

SUMMARY OF THE INVENTION

The present invention provides an improvement in the type of motor controller circuit in which a transistor has a control bias furnished primarily from a potentiometer, the bias voltage derived from the potentiometer being opposed by the output voltage of a tachometer generator that is mechanically coupled to the armature of the motor being controlled so as to produce a regenerative feedback signal. Specifically, the invention provides simplified circuitry for a motor controller of this type, and in which a novel circuit arrangement is utilized for achieving the filtering action which is necessarily associated with the feedback signal.

Thus the primary object and purpose of the invention is to provide a simplified but nevertheless improved motor controller circuit of the type in which the output of a tachometer generator is utilized in opposition to a potentiometer bias voltage for controlling the bias voltage of a transistor which in turn controls the motor speed.

THE DRAWING

In the drawing, the single figure is a schematic circuit diagram of my new motor speed controller.

DESCRIPTION OF PREFERRED EMBODIMENT

Referring now to the single figure of the drawing, it is seen that diodes D–1 and D–2 together with the silicon-controlled rectifiers SCR1 and SCR2 provide a full-wave bridge rectifier whose construction and operation are entirely conventional. This full-wave rectifier is connected to the A.C. supply line, and supplies potential from plus and minus terminals as indicated for energizing the motor armature. Diode D–3 which has its anode connected to the anodes of the SCR's, and its cathode connected to the cathodes of diodes D–1 and D–2, is a conventional free-wheeling diode whose purpose is to prevent an inductive kickback when the SCR's are turned off, and to thereby avoid prolonging the conductivity of the SCR's beyond what is intended.

The circuit of the single figure includes a shunt motor field winding, which is coupled in parallel with diode D–1, but depending upon the type of operation desired it is possible to use either a series winding alone, a shunt winding alone, or a combination of both windings having an appropriate number of turns in each.

A separate reference voltage is provided by a back-biased Zener diode indicated in the drawing by the symbol Z, for energizing the control circuits. A second full-wave rectifier is provided by a second pair of semiconductor diodes D–4 and D–5 in conjunction with the diodes D–1 and D–2 previously described. The cathode of D–4 is connected to the anode of D–1 and to one side of the A.C. line, the cathode of D–5 is connected to the anode of D–2 and to the other side of the A.C. line, while the anodes of D–4 and D–5 together provide a negative supply terminal. A dropping resistor R–6 connected between this negative terminal and via lead 13 to the anode of the Zener diode Z permits the Zener voltage to be held constant despite fluctuations in the A.C. supply line voltage. The cathode of diode Z is connected to the positive supply line 12.

A pulse transformer having a primary winding $T_{pri}$ and secondary windings $T_{s1}$ and $T_{s2}$ is utilized for controlling the conductivity of the SCR's. Thus the secondary winding $T_{s1}$ is connected between the gate and cathode terminals of SCR1 while secondary winding $T_{s2}$ is connected between the gate and cathode of SCR2. A unijunction transistor Q–1 has its primary conduction circuit connected in series with the primary winding of the transformer in order to selectively provide energy pulses for controlling the SCR's. A capacitor C–4 is coupled between the emitter of the unijunction transistor and one end of $T_{pri}$ to provide a series loop circuit, and as is well known in this circuit arrangement the voltage stored on the capacitor C–4 must achieve a certain value in order to fire the unijunction and hence pulse the transformer. Positive supply line 12 is connected to the cathodes of diodes D–1 and D–2 for supplying both the armature and the control circuitry, while negative supply lead 11 is connected to the anodes of the SCR's for supplying only the motor armature. It will thus be seen that the conduction of current in the supply lead 11 is controlled by the SCR's, and hence by the unijunction transistor Q–1.

During each half cycle only one of the SCR's is forward-biased, and hence able to be rendered conductive. The charging time of capacitor C–4 is such that the unijunction transistor Q–1 is pulsed once each half cycle. This places a positive pulse on the gate of each SCR, that is, the gate is rendered positive with respect to the cathode. The gating pulse has no effect on the back-biased SCR but does initiate conduction of the forward-biased SCR. The timing of the gate pulse determines the proportion of each half cycle in which current flows from the A.C. supply line. During the remaining (beginning) portion of each half cycle there is no current flow from the A.C. line, and the available energy is simply not being used.

A resistor R–4 is connected between lead 12 and one of the bases of the unijunction transistor, and $T_{pri}$ is connected to lead 13 so that the Zener voltage drives pulses through the unijunction transistor.

A second or control transistor Q–2 has its collector connected to the emitter (or control electrode) of the unijunction transistor Q–1, while its emitter is connected through a resistor R–5 to the lead 12. The base of transistor Q–2 is connected (indirectly) to the movable tap on a speed control potentiometer $P_1$.

The motor armature is connected between lines 11 and 12; a resistor R–1 is also connected between lines 11 and 12 in parallel with the armature; as is also a capacitor C–1. The voltage existing between leads 11 and 12, which is nominally the armature supply voltage, is derived from the A.C. line during the portion of each half-cycle when a corresponding one of the SCR's is conducting, but during the remaining or early portion of each half cycle it is derived from capacitor C–1 in conjunction with the armature itself. That is, when the supply line is isolated due to nonconduction of the SCR's the armature back E.M.F. supplies voltage which appears across the leads 11, 12. R–1 and C–1 together provide a filter which smoothes the running action of the motor.

Also included in the circuit is a tachometer generator designated as T.G. A mechanical linkage 15 drives the tachometer generator in synchronism with the rotation of the motor armature, thus permitting the generator to produce a D.C. voltage whose magnitude is proportional to the speed of the motor. One end of potentiometer P–1 is connected to line 12 while its other end is connected through a variable resistor R–2 to line 13. P–1 also has a variable center tap whose position is selectively adjusted for selecting a desired operating speed of the motor. A capacitor C–2 is connected between the center tap of $P_1$ and line 12. A potentiometer P–2 is connected in parallel across the output of the tachometer generator, and one end of P–2 is also connected to the center tap of P–1. P–2 also has a movable center tap which is connected to the base of Q–2. A series circuit including a resistor R–3 and a capacitor C–3 is connected between line 12 and the base of Q–2.

Resistor R–2 is made adjustable primarily as a factory setting, in order to adjust the operating range (in terms of motor speed) of potentiometer P–1. The useful function of capacitor C–2 is performed when the circuit is initially energized, to permit the motor to accelerate in a smooth and even fashion up to the selected speed setting. The polarity of connection of the generator T.G. is such that the output voltage from the generator (or more specifically, such portion of it as is selected across potentiometer P–2) is opposed to or subtracted from the bias voltage furnished from potentiometer P–1. Thus, the bias voltage of transistor Q–2, applied to its base, is equal to the potential derived from P–1 minus the selected portion of the output voltage of the tachometer generator. Potentiometer P–2 could, at least in theory, be simply a fixed resistor, but the use of the potentiometer provides a factory convenience and makes it possible to use generators whose characteristics vary somewhat and to compensate for this variation in characteristics by the setting of the movable tap on P–2.

The operation of the circuit is such that increases in the motor speed increase the output of the tachometer generator, which diminishes the bias on the control transistor Q–2 and delays the firing of the unijunction transistor Q–1 to a later point in each half-cycle. A reduction through the SCR's and in the voltage supplied to the armature. Decreases in motor speed have the opposite effect.

The function of R–3 and C–3 is to provide a low-pass filter, for filtering out ripple voltage supplied from the tachometer generator T.G. and preventing it from being applied to transistor Q–2. Regenerative action is therefore limited to only the very low frequencies which are of course essential to providing a response to changing conditions of motor load or line voltage fluctuations. For higher frequencies, however, the filter circuit precludes any significant response and thereby precludes the possibility of undesired oscillation. This circuit in practice, provides a very smooth motor operation.

The preferred circuit values are as follows:

| | | |
|---|---|---|
| R–1 | ohms | 5,000 |
| R–2 | do | 10,000 |
| R–3 | do | 62 |
| R–4 | do | 470 |
| R–5 | do | 1,000 |
| P–1 | do | 1,500 |
| P–2 | do | 5,000 |

| | | |
|---|---|---|
| C-1 | microfarads | 400 |
| C-2 | do | 250 |
| C-3 | do | 400 |
| C-4 | do | 0.15 |
| Diode Z (drop) | volts | 20 |
| Line voltage (A.C.) | do | 115 |
| Armature voltage (D.C.) | do | 115 |

With preferred circuit values as indicated above the motor control circuit of the present invention provides a speed regulation with changes in load of approximately 1%. The speed regulation for line voltage changes, where the line voltage changes do not exceed 10% of the standard or nominal line voltage value, is also approximately 1%.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

Having described the invention, what is claimed as new in support of Letters Patent is:

1. An A.C. motor speed controller for energizing, and controlling the speed of, a shunt D.C. motor, comprising, in combination:
    a pair of A.C. input terminals;
    a full-wave rectifier circuit including a pair of silicon-controlled rectifiers;
    a choke coil connected between one of said input terminals and one input of said rectifier circuit, the other input of said rectifier circuit being directly connected to the other of said terminals;
    circuit means connecting the output of said rectifier circuit to the motor armature;
    a pulse transformer having a pair of secondary windings, each connected between the gate and cathode of a representative one of said silicon-controlled rectifiers;
    a second rectifier circuit, a dropping resistor, and a Zener diode connected together in a series loop circuit to provide a stable supply voltage across said Zener diode;
    circuit means connecting the motor field across the output of said second rectifier;
    a unijunction transistor and a load resistor therefor, said load resistor, the main current-conduction path of said unijunction transistor, and the primary winding of said pulse transformer being connected in series with each other and in parallel across said Zener diode;
    a control transistor having its collector connected to the emitter of said unijunction transistor, a load resistor for said control transistor connected to the emitter thereof, and a charging capacitor for said unijunction transistor connected to the emitter thereof, the series combination of said control transistor, its load resistor, and said charging capacitor being also connected in parallel across said Zener diode;
    a potentiometer connected in parallel across said Zener diode, and having a movable tap;
    a tachometer generator having associated means for driving it from the motor armature;
    circuit means connecting the output voltage of said tachometer generator between said potentiometer movable tap and the base of said control transistor, in such polarity that the bias potential applied to said control transistor is equal to the potential derived from said potentiometer minus the output voltage of said tachometer generator; and
    a filter circuit including the series combination of a filter resistor and a filter capacitor and being connected between the said base of said control transistor and one terminal of said Zener diode in essentially parallel relationship to said load resistor for said control transistor.

2. A motor speed control circuit as claimed in claim 1 wherein said last-named circuit means includes a second potentiometer connected across the output of said tachometer generator, one end of said second potentiometer being connected to the movable tap of said first potentiometer, said second potentiometer having a movable tap which is connected to said base of said control transistor.

3. A motor speed control circuit as claimed in claim 1 wherein the time constant of said filter circuit is of the order of magnitude of one-fortieth of a second.

4. In a D.C. motor speed control circuit, the combination comprising:
    a control transistor having a base electrode whose potential is to be controlled for controlling the motor speed;
    a source of relatively fixed bias potential for said base;
    a tachometer generator;
    means for mechanically coupling said tachometer generator to the motor armature to be driven thereby;
    a resistor connected across the output of said tachometer generator, and also connected between said bias source and said transistor base;
    and a filter circuit including the series combination of a filter resistor and a filter capacitor, one end of said filter circuit being connected to said base, the other end of said filter circuit being connected to a point in the external circuit of the emitter-collector current conduction path of said transistor.

5. The motor speed control circuit claimed in claim 4 wherein said filter circuit has a time constant of the order of magnitude of one-fortieth of a second.

References Cited

UNITED STATES PATENTS

| | | | |
|---|---|---|---|
| 3,123,757 | 3/1964 | Gaudet | 318—327 |
| 3,239,742 | 3/1966 | Mierendorf | 318—331 |
| 3,249,839 | 5/1966 | Fay | 318—327 |
| 3,257,596 | 6/1966 | Wilkins | 318—327 |

ORIS L. RADER, *Primary Examiner.*

E. SUTTON, *Assistant Examiner.*